US006491304B2

(12) United States Patent
Sato et al.

(10) Patent No.: US 6,491,304 B2
(45) Date of Patent: Dec. 10, 2002

(54) CYLINDER HAVING GUIDE

(75) Inventors: Motohiro Sato, Ibaraki (JP); Hiroshi Miyachi, Ibaraki (JP)

(73) Assignee: SMC Corporation, Tokyo (JP)

( * ) Notice: Subject to any disclaimer, the term of this patent is extended or adjusted under 35 U.S.C. 154(b) by 75 days.

(21) Appl. No.: 09/802,920

(22) Filed: Mar. 12, 2001

(65) Prior Publication Data

US 2001/0027720 A1 Oct. 11, 2001

(30) Foreign Application Priority Data

Apr. 11, 2000 (JP) ....................................... 2000-109252

(51) Int. Cl.[7] ......................... B23B 31/10; B23Q 3/152; F01B 9/00

(52) U.S. Cl. .................... 279/2.09; 279/4.04; 279/4.12; 92/138

(58) Field of Search .............................. 279/4.12, 4.04, 279/2.09; 92/138

(56) References Cited

U.S. PATENT DOCUMENTS 1,934,411 A * 11/1933 Dahlman
2,293,085 A * 8/1942 Stieber
3,199,416 A * 8/1965 Robson
3,467,401 A * 9/1969 Berge
3,612,553 A * 10/1971 Ovanin
4,712,720 A * 12/1987 Tesch
5,676,038 A * 10/1997 Hosono

* cited by examiner

*Primary Examiner*—Sebastiano Passaniti
(74) *Attorney, Agent, or Firm*—Oblon, Spivak, McClelland, Maier & Neustadt, P.C.

(57) ABSTRACT

In a cylinder having a piston 2 and a cylinder body 3 having a piston chamber 4 in which said piston 2 is slidably accommodated, a guide shaft 9 extending toward the piston chamber 4 is provided on a head-side end wall 8 of the cylinder body 3, and the piston 2 includes a guide hole **2*c* in which the guide shaft 9 is accommodated. A plurality of grooves 9*a* and 2*d* respectively extending in axial directions are provided between an outer peripheral surface of the guide shaft 9 and an inner peripheral surface of the guide hole 2*c*. A plurality of steel balls 13 are provided between the grooves 9*a* and 2*d***.

9 Claims, 3 Drawing Sheets

CYLINDER HAVING GUIDE

TECHNICAL FIELD

The present invention relates to a cylinder of a short stroke having a guide in which the guide is provided in a piston.

PRIOR ART

In the case of a cylinder of a short stroke slidably accommodating a piston in a piston chamber, a piston rod is supported by a bearing or the like so that the piston is prevented from being inclined and the piston can slide smoothly.

However, if the bearing is provided, there are problems that a height (axial length) of the cylinder can not be suppressed to a low level, and if the bearing which suppresses the height of the cylinder to the low level, the piston rod is inclined and a sliding surface is scratched by scoring.

DISCLOSURE OF THE INVENTION

It is an object of the present invention to provide a thin cylinder (of a short stroke) having a guide in which a height of a cylinder can be suppressed to a low level, there is no scoring, and inclination and rotation of a piston are prevented.

It is another object of the invention to provide a cylinder having a guide having a simple structure and capable of preventing a piston from being inclined.

To achieve the above objects, the present invention provides a cylinder having a guide, including a cylinder body provided therein with a piston chamber surrounded by a side wall, a rod-side end wall and a head-side end wall, and a piston slidably accommodated in the piston chamber, wherein the piston comprises a piston body which is air-tightly slides in the piston chamber by action of fluid pressure, a piston rod extending from a central portion of the piston body and passing through the rod-side end wall and projecting outside of the cylinder body, and a guide hole formed in central portions of the piston body and the piston rod, the head-side end wall of the cylinder body includes a guide shaft extending from a central portion of an inner surface of the head-side end wall into the piston chamber and fitted into the guide hole, a plurality of sets of grooves are formed at positions at which an inner surface of the guide hole and an outer surface of the guide shaft are opposed such as to be located at positions which are symmetric with respect to a point of a center of the guide shaft, and a plurality of steel balls are interposed between the grooves such that the steel balls can roll.

In this cylinder having the above structure, if pressure fluid is supplied to or discharged from the piston chamber, the piston slides in the vertical direction in the cylinder, but at that time, the piston is guided by the guide shaft provided in the piston and thus, the piston is not inclined.

Further, the piston is guided through the plurality of steel balls provided in the plurality of grooves extending in the axial direction of the piston and the guide shaft, and the guide shaft is fixedly formed at the head-side end wall and does not move. Therefore, the piston can slide in the axial direction but can not turn.

The steel balls roll in the grooves extending in the axial direction of the piston and the guide shaft as the piston slides. Therefore, the piston slides smoothly, and no scoring is generated when the piston slides.

Since the guide shaft is provided in the piston, the height of the cylinder can be suppressed to a lower level and thus, the cylinder can be made thin, and the pressure receiving area of the piston can be made wide.

Therefore, if the cylinder having the guide of the present invention is used as a power source for an air chuck or a rotary actuator, since the cylinder is thin, the air chuck or the rotary actuator can be reduced in size. Since the pressure receiving area of the piston is wide, a great driving force can be obtained although its size is small. Since the piston slides only in the axial direction and does not rotate, its action is correct.

According to one of embodiments of the present invention, the guide shaft includes pins at opposite ends of each of the grooves for preventing the steel balls from falling out.

According to another embodiment, a side wall of the cylinder body and the rod-side end wall are formed as one piece, the head-side end wall and the guide shaft are formed as one piece and connected to the side wall.

The cylinder of the present invention can be formed as a double-acting cylinder or a single-acting cylinder. When the single-acting cylinder is employed, the cylinder has two pressure chambers divided by the piston body, one of the chamber is connected to a supply port, a return spring is provided in the other chamber such that the return spring repels the piston body at a position separated away from the piston rod.

The cylinder having the guide of the invention, a chuck mechanism, a turning table or the like can be added, and the cylinder can be used as a power source for the air chuck or the rotary actuator. In this case, since the cylinder is thin, the air chuck or the rotary actuator can be reduced in size. Since the pressure receiving area of the piston is wide, a great driving force can be obtained although its size is small. Since the piston slides only in the axial direction and does not rotate, its action is correct.

When the chuck mechanism is added to the cylinder of the invention, the chuck mechanism includes guide means fixed on the cylinder body, a plurality of jaw members which are opened and closed along the guide means, and a link mechanism connected to the jaw members and the piston rod for converting a forward and a backward motion of the piston rod into an opening and closing motion of the jaw members.

When the turning table is added to the cylinder of the invention, the turning table is mounted on the cylinder body such that the turning table can rotate around a center axis of the piston, and a converting mechanism for converting a forward and a backward motion of the piston into a rotational motion of the turning table is connected to the turning table and the piston.

The converting mechanism is constituted by a plurality of thread grooves formed in an inner peripheral surface of the hole into which the piston rod of the central portion of the turning table is fitted, and a plurality of sliding elements projected from a side surface of the piston rod and fitted to one of the thread grooves.

DETAILED EXPLANATION

Figure 1:
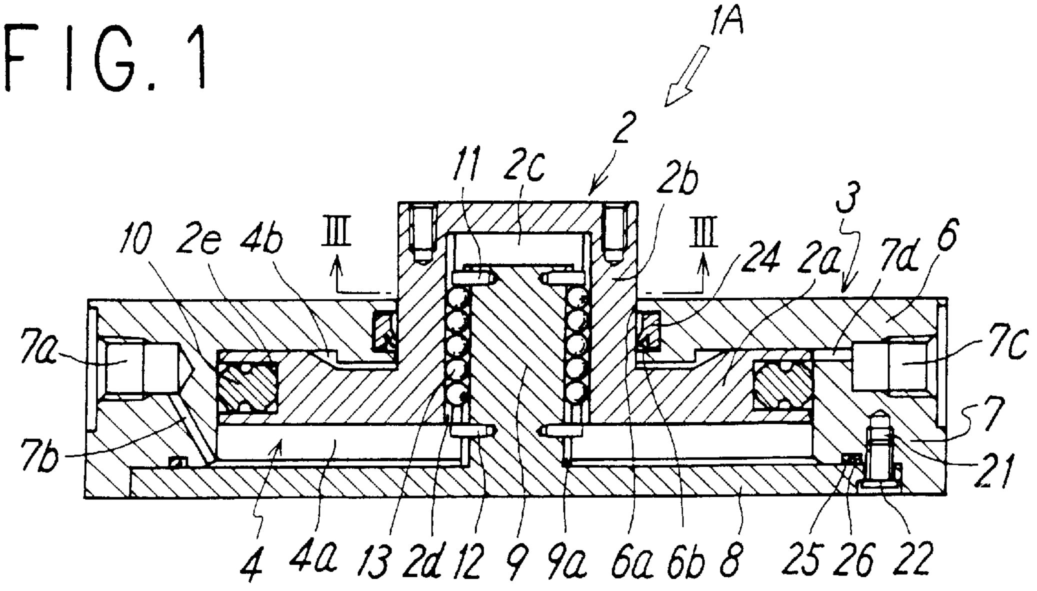
FIG. 1 is a sectional view showing a first embodiment of a cylinder having a guide according to the present invention in which a piston is lifted.
Figure 2:
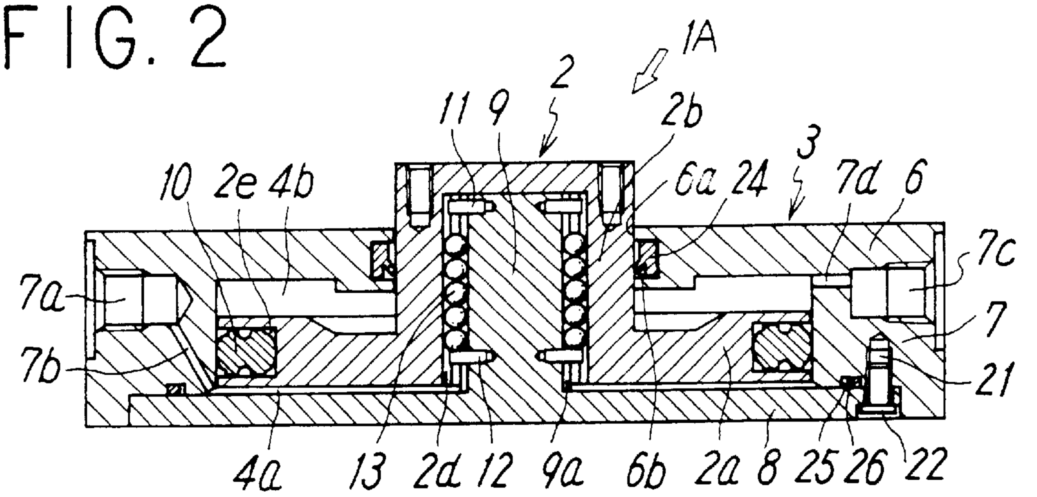
FIG. 2 is a sectional view showing a state in which the piston of the first embodiment is lowered.
Figure 3:
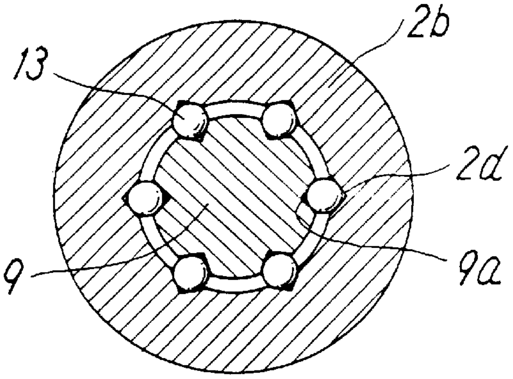
FIG. 3 is a sectional view taken along a line III—III in FIG. 1.

FIGS. 1 to 3 show a first embodiment of a cylinder having a guide according to the present invention, in which FIG. 1 shows a lifted piston, FIG. 2 shows the lowered piston and FIG. 3 is a sectional view taken along a line III—III in FIG. 1.

A cylinder 1A is a thin cylinder of a short stroke. The cylinder 1A includes a short cylindrical or short prism cylinder body 3. A piston chamber 4 surrounded by a rod-side end wall 6 and an end wall 8 at the side of a side wall 7 and a head is formed in the cylinder body 3. A piston 2 is slidably accommodated in the piston chamber 4.

The piston 2 includes a piston body 2*a* which air-tightly slides on an inner peripheral surface of the side wall 7 and which divides the piston chamber 4 into two pressure chambers 4*a* and 4*b*, and a piston rod 2*b* projecting outside through a hole 6*a* formed in the rod-side end wall 6 from a central portion of the piston body 2*a*. The piston body 2*a* and the piston rod 2*b* are provided at their central portion therein with a circular guide hole 2*c* formed from an end surface at the side of the pressure chamber 4*a* to an intermediate portion of the piston rod 2*b* such that the piston rod 2*b* is not completely penetrated.

The head-side end wall 8 is provided at its inner surface central position with a cylindrical guide shaft 9 extending toward the piston chamber 4. This guide shaft 9 is fitted into the guide hole 2*c* of the piston rod 2*b* while keeping a gap around the guide hole 2*c*.

As pressure fluid to be supplied to the piston chamber 4, compressed air is suitable, but the fluid is not limited to this, and other gas or liquid can also be used.

The piston body 2*a* is provided at its outer peripheral surface with an annular groove 2*e*. A piston packing 10 is mounted to the annular groove 2*e* so that the piston body 2*a* can air-tightly slide on the inner wall of the piston chamber 4 by the piston packing 10.

A plurality of sets of grooves 9*a*, 2*d* each having a V-shaped cross section or an arc cross section are formed at positions at which an outer surface of the guide shaft 9 and an inner surface of the guide hole 2*c* are opposed such as to extend in an axial direction of the guide shaft 9 at positions which are symmetric with respect to a point of a center of the guide shaft 9. A plurality of steel balls 13 are interposed between the opposed grooves 9*a* and 2*d* such that the balls 13 can roll therein in a state in which portions of the steel balls 13 are fitted in the respective grooves. Pins 11 and 12 are projected from upper and lower portions of the grooves 9*a* in the guide shaft 9. The pins 11 and 12 prevent the steel balls 13 from falling out.

In FIG. 3, six sets of the grooves 9*a*, 2*c* are provided, but the number of the sets is not limited to six only if two sets or more of grooves 9*a*, 2*c* are provided.

The rod-side end wall 6 and the side wall 7 of the cylinder body 3 are formed as one piece. The head-side end wall 8 having the guide shaft 9 is fixed to the side wall 7 by a bolt 22 screwed into a screw hole 21 formed in a bottom of the side wall 7. A seal member 26 for sealing between the head-side end wall 8 and the annular groove 25 is mounted in the annular groove 25 provided at the bottom of the side wall 7.

The side wall 7 is formed with supply ports 7*a*, 7*c* and passages 7*b*, 7*d* for supplying and discharging the pressure fluid to and from pressure chambers 4*a*, 4*b* on the opposite sides of the piston body 2*a*.

An annular groove 6*b* is formed in an inner peripheral surface of the hole 6*a* formed in the rod-side end wall 6 and an annular seal member 24 is mounted on the groove 6b so that the piston rod 2*b* can air-tightly slide on the inner peripheral surface of the hole 6*a* by the seal member 24.

If the cylinder 1A having the above-described structure alternately supplies the pressure fluid from the ports 7*a*, 7*c* to the pressure chambers 4*a* and 4*b*, the piston body 2*a* slides in the piston chamber 4, and the piston rod 2*b* moves forward and backward at the same time. At that time, since the piston body 2*a* and the piston rod 2*b* are guided by the guide shaft 9 through the steel balls 13 which roll in the grooves 9*a* and 2*d*, the piston body 2*a* and the piston rod 2*b* are not inclined and move smoothly.

The steel balls 13 mounted between the piston 2 and the guide shaft 9 are fitted in the grooves 9*a* and 2*d* formed in the piston 2 and the guide shaft 9, the piston 2 is locked by the guide shaft 9 in a rotational direction of the piston 2 and therefore, the piston 2 is prevented from rotating at the time of operation thereof.

Figure 4:
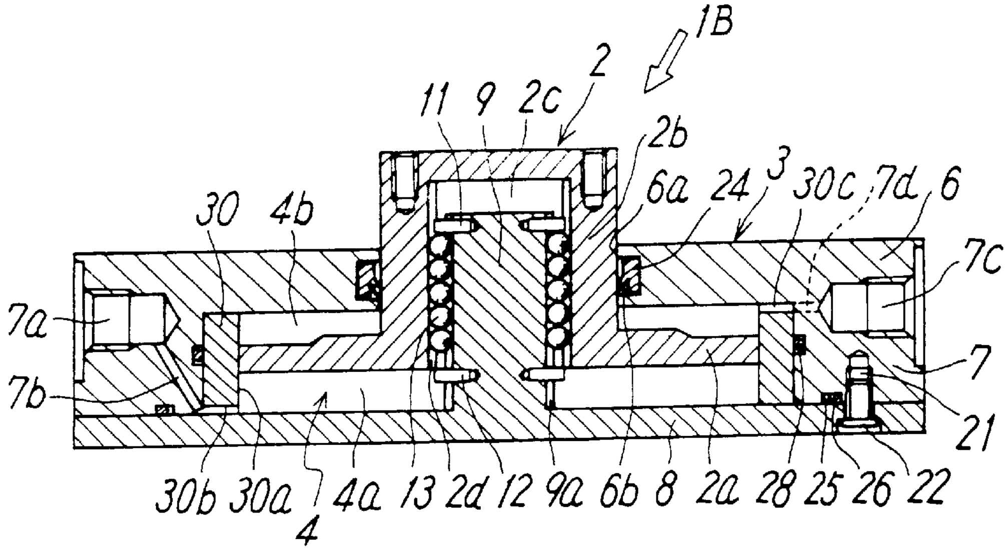
FIG. 4 is a sectional view showing a second embodiment of a cylinder having a guide according to the invention.

FIG. 4 shows a second embodiment of the cylinder having the guide of the present invention. A cylinder 1B of the second embodiment is different from the cylinder 1A of the first embodiment in that a metal seal is used instead of the piston packing 10 as means for keeping the air-tightness of the piston body 2*a*.

That is, a hollow cylindrical metal tube 30 is air-tightly mounted on an inner side of the side wall 7 through a seal member 28, and the piston body 2*a* is air-tightly slid on an inner wall 30*a* of the metal tube 30. Therefore, in this case, the piston body 2*a* is not provided with the piston packing 10, and the outer peripheral surface of the piston body 2*a* is sealed by directly abutting against the inner wall 30*a* of the metal tube 30.

The metal tube 30 is provided at its position corresponding to the passages 7*b*, 7*d* of the side wall 7 with small holes 30*b*, 30*c*, and the pressure fluid can be supplied and discharged to and from the pressure chambers 4*a*, 4*b* through the small holes 30*b*, 30*c*.

Since other structure of the second embodiment is substantially the same as that of the first embodiment, the same constituent members are designated with the same reference symbols, and explanations thereof are omitted.

Figure 5:
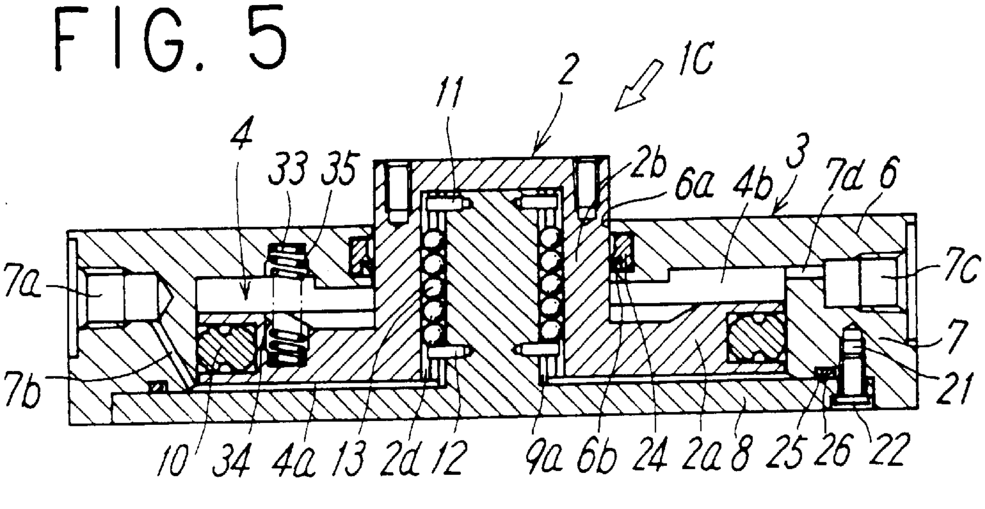
FIG. 5 is a sectional view showing a third embodiment of a cylinder having a guide according to the invention.

FIG. 5 shows a third embodiment of a cylinder having a guide according to the present invention. This cylinder 1C is different from that of the first embodiment in that the cylinder 1C is a single-acting cylinder. That is, a recess 34 is formed at a position of an upper surface of the piston body 2*a* away from the piston rod 2*b*, a recess 35 is formed at a position on the inner surface of the rod-side end wall 6 corresponding to the recess 34, opposite ends of a return spring 33 are accommodated in the recesses 34 and 35 respectively, and the piston body 2*a* is always biased in its returning direction by the return spring 33. An upper chamber 4*b* of the piston body 2*a* is an aspiration chamber, and the aspiration chamber 4*b* is always in communication with atmosphere through an aspiration port 7*c*'.

In this third embodiment, since the piston body 2*a* is always pressed downward by the return spring 33, the pressure fluid is supplied and discharged to and from the pressure chamber 4*a* located at a lower side of the piston body 2*a* so that the piston 2 can be moved vertically. This cylinder having the guide sufficiently prevents the inclination and rotation of the piston by means of the guide shaft 9. Therefore, it is unnecessary to provide the return spring 33 at a center of the piston, and flexibility in design is excellent.

Since other structure of the third embodiment is substantially the same as that of the first embodiment, the same constituent members are designated with the same reference symbols, and explanations thereof are omitted.

Figure 6:
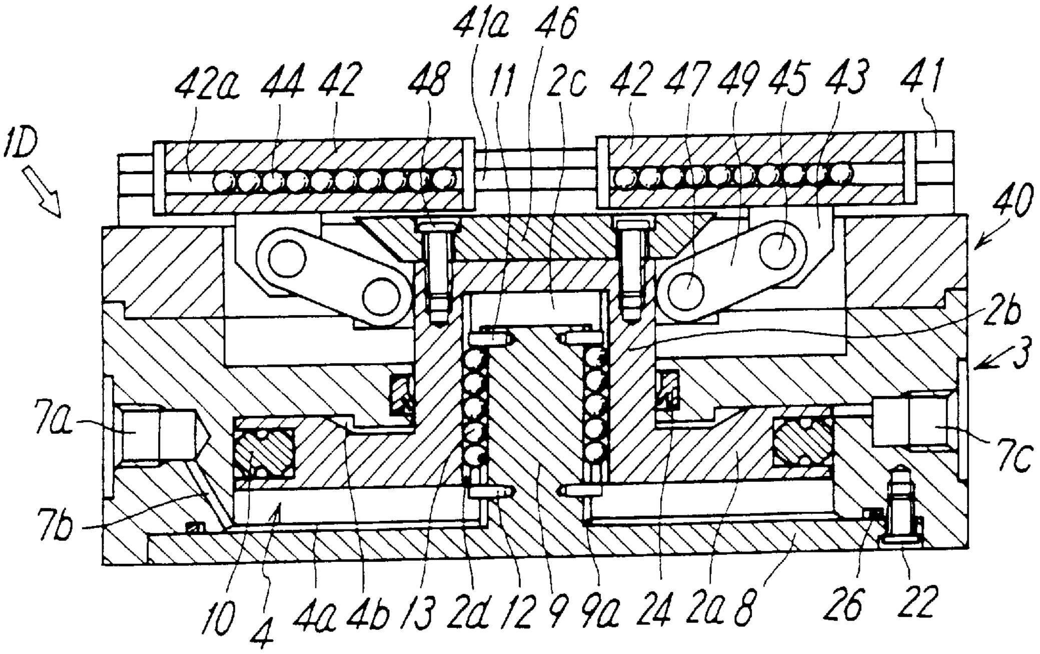
FIG. 6 is a sectional view showing a fourth embodiment of a cylinder having a guide according to the invention.

FIG. 6 shows a fourth embodiment of a cylinder having a guide according to the present invention. This cylinder 1D is different from that of the first embodiment in that the cylinder body 3 is provided at its upper portion with a chuck mechanism 40 for chucking a work.

The chuck mechanism 40 includes a pair of guide members 41, 41 fixed on an upper surface of the cylinder body 3 at a predetermined distance from each other, and a pair of left and right jaw members 42, 42 disposed between the guide members 41, 41. Grooves 41*a*, 42*a* are formed at positions at which inner surfaces of the guide members 41, 41 and outer surface of the jaw members 42, 42 are opposed. A plurality of steel balls 44 are interposed between the grooves 41*a* and 42*a* so that the steel balls 44 can roll. The jaw members 42, 42 moves along the guide members 41, 41 through the steel balls 44. A link mechanism is provided between each of the jaw members 42 and the piston rod 2*b* for converting a vertical motion of the piston rod 2*b* into an opening and closing motion of the pair of jaw members 42, 42.

The link mechanism comprises a link 49 rotatably connected by pins 45 and 47 between a connecting member 43 extending from the jaw members 42 and a mounting member 46 mounted on an upper end of the piston rod 2*b* by bolts 48. When the piston rod 2*b* is lifted as shown in the drawing, the pair of jaw members 42, 42 are opened, and when the piston rod 2*b* is lowered, the jaw members 42, 42 are closed, and a work is chucked directly between the jaw members 42, 42 or through an adapter.

In the case of the cylinder 1D having the guide of the fourth embodiment, since the vertical motion of the piston 2 is converted into the opening and closing motion of the pair of jaw members 42, 42, the cylinder 1D can be used as an air chuck. Further, since the cylinder is thin, a small air chuck can be realized. Further, since a pressure receiving area of the piston is wide, a great driving force can be obtained even if the cylinder is small, and since the piston slides in the axial direction and does not turn, there is merit that the motion is correct.

It is also possible to provide three or more jaw members 42, and to open and close the jaw members in a radial direction.

Since other structure of the fourth embodiment is substantially the same as that of the first embodiment, the same constituent members are designated with the same reference symbols, and explanations thereof are omitted.

Figure 7:
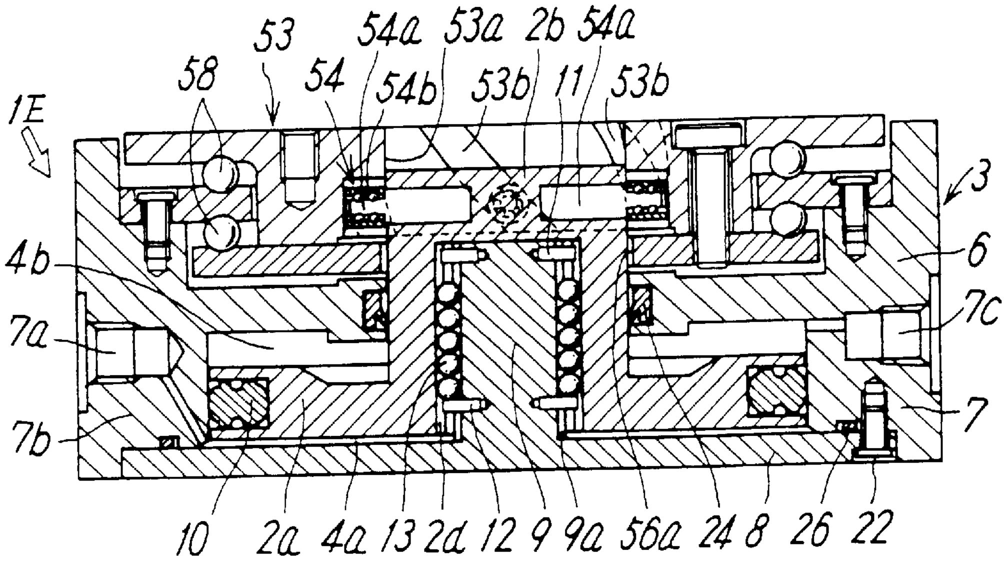
FIG. 7 is a sectional view showing a fifth embodiment of a cylinder having a guide according to the invention.

FIG. 7 shows a fifth embodiment of the cylinder having the guide of the present invention. This embodiment is different from the first embodiment in that a cylinder 1E has a turning table 53 on an upper portion of the cylinder body 3.

That is, a table support member 51 is fixed on the upper portion of the cylinder body 3 by bolts 52, the turning table 53 is mounted to the table support member 51 such that the turning table 53 can turn around a center axis of the piston 2, and the vertical motion of the piston 2 is converted into a turning and rocking motion of the turning table 53. More particularly, the turning table 53 includes an upper plate 53*c* on which a work is placed, and a lower plate 56 extending downward from a lower surface of the upper plate 53*c* and fixed to a portion passing through the table support member 51 by a bolt 57. Annular recess grooves are formed at positions at which upper and lower surfaces of the table support member 51, a lower surface of the upper plate 53*c* and an upper surface of the lower plate 56 are opposed. A plurality of steel balls 58 are interposed between the recess grooves such that the steel balls 58 can roll. The turning table 53 is smoothly rotatably supported through the table support member 51 as a guide by the steel balls 58.

The turning table 53 is provided at its center with a hole 53*a* for accommodating the piston rod 2*b*, and a plurality of thread grooves 53*b* are formed in the inner peripheral surface of the hole 53*a*. A plurality of sliding elements 54 are projected from an outer peripheral surface of an upper end of the piston rod 2*b*. The sliding elements 54 are fitted to the respective thread grooves 53*b*, and the thread grooves 53*b* and the sliding elements 54 constitute a conversion mechanism which converts the vertical motion of the piston rod 2*b* into a rotation motion of the turning table 53.

Each of the sliding elements 54 comprises a support shaft 54*a* whose base end is inserted ant fixed to a hole formed in a side surface of the piston rod 2*b*, and a roller 54*b* rotatably mounted to a tip end of the support shaft 54*a*. The roller 54*b* is fitted to the thread groove 53*b*.

In this fifth embodiment, if the piston 2 moves vertically and lifted to a position shown in the drawing, the pair of jaw members are opened in left and right directions, and if the piston 2 is lowered, the pair of jaw members are opened in left and right directions.

The cylinder 1E having the guide in this fifth embodiment, since the vertical motion of the piston 2 is converted into the rotation and rocking motion of the turning table 53, the cylinder can be used as a rotary actuator. Further, since the cylinder is thin, the cylinder can be used as a small rotary actuator. Since the pressure receiving area of the piston is wide, a great driving force can be obtained although its size is small. Since the piston slides only in the axial direction and does not rotate, its action is correct.

Since other structure of the fifth embodiment is substantially the same as that of the first embodiment, the same constituent members are designated with the same reference symbols, and explanations thereof are omitted.

It is of course possible that the cylinder of each of the third to fifth embodiments can employ the metal seal type of the second embodiment.

As described above in detail, according to the thin cylinder having the guide of the present invention, a height of a cylinder can be suppressed to a low level, there is no scoring, inclination and rotation of a piston are prevented.

If the cylinder having the guide of the present invention is used as a power source of an air chuck or a rotary actuator, since the cylinder is thin, the air chuck or the rotary actuator can be reduced in size. Since the pressure receiving area of the piston is wide, a great driving force can be obtained although its size is small. Since the piston slides only in the axial direction and does not rotate, its action is correct.

What is claimed is:

1. A cylinder of a short stroke having a guide, including a cylinder body provided therein with a piston chamber surrounded by a side wall, a rod-side end wall and a head-side end wall, and a piston slidably accommodated in the piston chamber, wherein said piston comprises a piston body which air-tightly slides in said piston chamber by action of fluid pressure, a piston rod extending from a central portion of said piston body and passing through said rod-side end wall and projecting outside of said cylinder body, and a guide hole formed in central portions of said piston body and said piston rod, said head-side end wall of said cylinder body includes a guide shaft extending from a central portion of an inner surface of said head-side end wall into said piston chamber and fitted into said guide hole, a plurality of sets of grooves are formed at positions at which an inner surface of said guide hole and an outer surface of said guide shaft are opposed such as to be located at positions which are symmetric with respect to a point of a center of the guide shaft, and a plurality of steel balls are interposed between the grooves such that said steel balls can roll.

2. A cylinder having a guide according to claim 1, wherein said guide shaft includes pins at opposite ends of each of said grooves for preventing said steel balls from falling out.

3. A cylinder having a guide according to claim 1, wherein a side wall of said cylinder body and said rod-side end wall are formed as one piece, said head-side end wall and said guide shaft are formed as one piece and connected to said side wall.

4. A cylinder having a guide according to claim 1, wherein said cylinder is a double-acting cylinder, and has two pressure chambers divided by said piston body, said pressure chambers are connected to supply ports, respectively.

5. A cylinder having a guide according to claim 1, wherein said cylinder is a single-acting cylinder, and has two pressure chambers divided by said piston body, one of said chamber is connected to a supply port, a return spring is provided in the other chamber such that said return spring repels said piston body at a position separated away from said piston rod.

6. A cylinder having a guide according to claim 1, wherein said cylinder has a chuck mechanism for chucking a work on said cylinder body.

7. A cylinder having a guide according to claim 6, wherein said chuck mechanism includes guide means fixed on said cylinder body, a plurality of jaw members which are opened and closed along said guide means, and a link mechanism connected to said jaw members and said piston rod for converting a forward and a backward motion of said piston rod into an opening and closing motion of said jaw members.

8. A cylinder having a guide according to claim 1, wherein said cylinder includes a turning table mounted on said cylinder body such that said turning table can rotate around a center axis of said piston, and a converting mechanism for converting a forward and a backward motion of said piston into a rotational motion of said turning table.

9. A cylinder having a guide according to claim 8, wherein said turning table is disposed such that the table is fitted to said piston rod at a hole provided at a central portion of said turning table, said converting mechanism is constituted by a plurality of thread grooves formed in an inner peripheral surface of said hole, and a plurality of sliding elements projected from a side surface of said piston rod and fitted to one of said thread grooves.

* * * * *